US012417147B2

(12) United States Patent
Michaels et al.

(10) Patent No.: US 12,417,147 B2
(45) Date of Patent: Sep. 16, 2025

(54) EFFICIENT MULTIPLE CONCURRENT BACKUP LWD FILTER

(71) Applicant: Dell Products L.P., Round Rock, TX (US)

(72) Inventors: Nomi Michaels, Be'er Sheba (IL); Jehuda Shemer, Kfar Saba (IL); Ofir Ezrielev, Be'er Sheba (IL); Maxim Grabov, Petah-Tiqva (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/302,609

(22) Filed: Apr. 18, 2023

(65) Prior Publication Data
US 2024/0354197 A1   Oct. 24, 2024

(51) Int. Cl.
*G06F 11/00* (2006.01)
*G06F 11/14* (2006.01)

(52) U.S. Cl.
CPC ...... *G06F 11/1451* (2013.01); *G06F 11/1464* (2013.01); *G06F 11/1466* (2013.01)

(58) Field of Classification Search
CPC .......... G06F 11/1451; G06F 11/1464; G06F 11/1466; G06F 11/1458; G06F 11/3419; G06F 11/3423; G06F 11/3612
See application file for complete search history.

(56) References Cited

U.S. PATENT DOCUMENTS

2013/0326176 A1* 12/2013 Bachar ............... G06F 11/3442
711/E12.103
2024/0354199 A1   10/2024 Michaels et al.

FOREIGN PATENT DOCUMENTS

CN          102073464 A  *  5/2011

* cited by examiner

*Primary Examiner* — Katherine Lin
(74) *Attorney, Agent, or Firm* — Workman Nydegger

(57) ABSTRACT

One example method includes receiving backup requests, creating a respective bitmap fragment for each backup request, each bitmap fragment corresponding to a respective tracking start time, for one of the requested backups, identifying a group of bitmap fragments that correspond to at timeframe extending from a time at which a previous backup was requested to a time at which the particular backup was requested, using the bitmap fragments of the group to create a consolidated bitmap that includes all changes to data in a volume resulting from IOs during the timeframe, with the consolidated bitmap, reading the data from the volume and transmit the data to a recipient, identifying new write IOs, received in parallel with transmission of the data, that are directed to data included in the particular backup, and reading, from the volume, the data to which the new write IOs are directed, and temporarily storing that data.

20 Claims, 6 Drawing Sheets

EFFICIENT MULTIPLE CONCURRENT BACKUP LWD FILTER

FIELD OF THE INVENTION

Embodiments of the present invention generally relate to data protection. More particularly, at least some embodiments of the invention relate to systems, hardware, software, computer-readable media, and methods, for a light weight filter design that supports multiple concurrent backups.

BACKGROUND

Light weight filter designs may be used to identify data that is needed to support snapshot requests. Conventional approaches to such filter designs typically are able to support only a single concurrent backup of an asset. This is problematic however, since customers are increasingly requesting multiple concurrent backups of a single asset.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
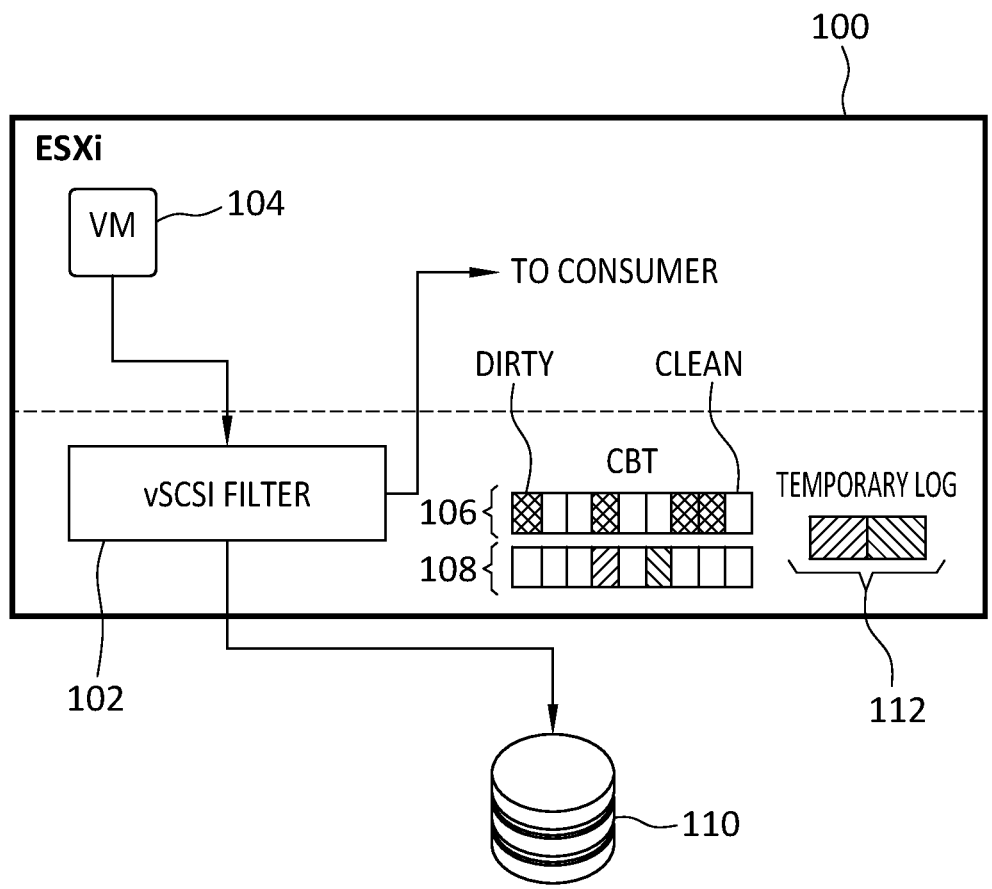
FIG. 1 discloses aspects of an architecture in which an embodiment of the invention may be implemented.

Embodiments of the present invention generally relate to data protection. More particularly, at least some embodiments of the invention relate to systems, hardware, software, computer-readable media, and methods, for a light weight filter design (LWD) that supports multiple concurrent backups.

In general, an example embodiment of the invention, which may implement and/or facilitate the implementation of, multiple parallel backup streams of a single asset, may involve metadata tracking, and data transfer. Note that as used herein, a backup stream may alternatively be expressed as a stream of multiple backups, where a snapshot is one example of a backup. Thus, a first backup stream may comprise a first snapshot that covers a time period extending from T0-T1, a second snapshot that covers a time period extending from T1-T2, and a third snapshot that covers a time period extending from T2-T3. Each of the snapshots may comprise changes that have occurred to data on disk during the indicated time period. A second parallel backup stream may be similarly configured as the first backup stream, that is, the second parallel backup stream may comprise a series of snapshots or other backups that collectively comprise changes that have occurred to data on disk during a time period collectively defined by the series of snapshots. A backup stream may be created according to a particular cadence, as discussed elsewhere herein. For simplicity of reference, the discussion herein may refer to snapshots, but it should be understood that the scope of the invention is not so limited, and embodiments may be implemented in connection with various other types of data protection operations, examples of which are disclosed herein.

In an embodiment, which may be performed in whole or in part by a filter, examples of which include a VAIO filter (VMware vSphere APIs for I/O Filtering) or a vSCSI filter, a request for a snapshot or other backup of an asset may trigger the creation of a new, or 'active,' bitmap fragment, so called because it may only track changes to the asset that occur after a point in time at which the snapshot request was made, rather than tracking all changes to all of the data of an asset. That is, changes, such as in the form of write, or output, operations, may continue to be implemented with respect to the asset after the snapshot has been requested, and the bitmap fragment, which may correspond to a particular time period commencing at, or after, the snapshot request, enables these changes to be tracked without interfering with the IO operation. Note that as used herein, an IO operation may consist only of a 'write' operation.

The timeframe covered by the snapshot may span multiple different 'inactive' or 'old' bitmap fragments that were created prior in time to the 'new' bitmap fragment and, as such, an embodiment may perform a differential map calculation that captures the differences accumulated over the time period collectively represented by the multiple bitmap fragments. Completion of the differential map calculation may result in a single consolidated bitmap that represents areas, or addresses, on a storage disk or other storage element where the snapshot data was overwritten by the IOs. Undo data for any IOs may be written to a temporary log which may then be sent to the consumer or other user. In an embodiment, the consolidated bitmap is not sent to the consumer and is only used to identify which data should be sent to the consumer. Note that there may be overlap between the data identified by the consolidated bitmap, and the data sent to the consumer. The following examples are illustrative.

In the case of data transmission, that is, transmission of backup data to the consumer, for each bit 'b' in a consolidated bitmap: if the consolidated bitmap[b] is dirty, read the area represented by 'b' from the volume and send that data to the consumer. While this process, which loops through each of the bits 'b' of the consolidated bitmap, is ongoing, if IOs come in to address X, for example, on the disk, then:

```
bitnumber = Floor(X/granularity)   //rounding down
   If consolidated_bitmap[bitnumber] is dirty:
      Read area represented by bitnumber from volume and store in
   temporary logs
```

After transmission of all of the data to the consumer, then send the temporary logs to consumer. Alternatively, before an IO is read/sent in the data transmission loop, a check may be performed to determine if the corresponding data is, or is not, in the temporary log. If the data is present, read/send it from the temporary log instead. The undo data may be applied to the snapshot to ensure that the snapshot accurately reflects the data as it existed at the point in time to which the snapshot corresponds.

Because a respective bitmap fragment may be created for each of several backup streams concerning a single asset, an embodiment may enable multiple concurrent backups of the asset to be performed, even when IOs continue to come in while one or more of the backups are being performed. Correspondingly, an embodiment may enable each backup to achieve a consistent state through the use of undo data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect is that an embodiment may enable multiple concurrent, and consistent, backups of a single asset to be performed, even when IOs continue to come in that are directed to data that is to be captured by one or more of the backups. As another example, an embodiment may accommodate multiple concurrent backups using only a single tracking bitmap at a time to track all of the backups so that even though there are parallel backup streams, only a single tracking bitmap is needed to track all of those parallel backup streams. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. OVERVIEW OF CHANGE BLOCK TRACKING (CBT) AND LIGHT WEIGHT DELTAS (LWD)

A.1 Change Block Tracking

CBT is an algorithm that may be used to track changed areas of volumes, such as VMDKs (virtual machine disk) for example, using a bitmap. Every bit in the bitmap represents a fixed size extent, such as 64 KB for example, and the index of the bit correlates to the location of that bit on the volume. For example, bit 0 is the first 64 KB of the volume, bit 1 the next 64 KB, and so forth.

The bitmap may initially be cleared, that is, all bits in the bitmap may be set to zero. Then, when an IO comes into a location of the volume to which the bitmap corresponds, the bits that correspond to that location are set to 1. Any overlap between the IO, and the extent covered by the bit, counts. For example, an 8 KB IO to address 0 will mark the first bit in the bitmap as 1, even though the size of the extent (64 KB) in the bitmap is significantly larger than the IO (8 KB) that caused the bit to be set at 1. Thus, the finer the granularity of the bitmap, that is, the smaller the size of the extents, the more accurate the tracking is. To illustrate using the preceding example, if the extent size were 8 KB, instead of 64 KB, and the IO is 8 KB, then the bitmap exactly reflects the IO. Such granularity comes at a price however, since it may imply a larger bitmap which in turn requires more memory for storage, and more resources to perform the IO tracking.

Some implementations of CBT, such as the VMware CBT, may use a fixed bitmap extent size of 256 KB (2M bits) which means that the extent size per bit increases, thus reducing granularity, as disk size increases, that is, the size of the disk to which the bitmap corresponds. In one illustrative case, 8 KB is the minimum extent size but on a 64 TB VMDK for example, every bit will cover 32 MB. For many volume sizes, the granularity is 8 KB-128 KB. In a recent VMware LWD implementation, the CBT implementation has a resolution of 8 KB-64 KB with variable bitmap sizes. Note that the VMware case is provided only by way of example, and bitmap tracking, and other operations, disclosed herein may be performed in a variety of contexts and environments, including virtual environments and physical environments.

A.2 Light Weight Delta (LWD)

With attention now to FIG. 1, an example architecture 100 for an LWD flow is disclosed. The example architecture 100 may comprise, or be implemented in, a data protection environment which may comprise, for example, a cloud storage environment, an on-premises storage environment, or a hybrid combination of these.

In general, a filter 102 may comprise any mechanism configured and operable to intercept IOs on an IO path. The IO may be received by the filter 102 from any of a variety of sources which may be operating in a physical or virtual infrastructure. Such sources may include, but are not limited to a VM (virtual machine), container, Kubernetes pod, or physical host, for example. In terms of its deployment, the filter 102 be implemented as part of the infrastructure 100 but may alternatively be located elsewhere in an IO path such as, for example, in the IO source 104, or lower in the IO path, such as in the underlying volume 110 of a storage system.

The filter 102 may receive or intercept one or more IOs, and may mark an 'old' bitmap 106 with the IOs. At some point, a snapshot may be requested, and a 'new' bitmap 108 created to capture IOs that come in before the snapshot can be completed. Data to which the IOs are directed before the snapshot is complete, that is, the data corresponding to the dirty bits of the new bitmap 108, may be copied from a volume 110 to a temporary log 112 before the new IOs are written. This data in the temporary log 112 may be used later undo the IOs that were written to the volume before the snapshot could be completed and, in this way, the snapshot may be made consistent as of the requested point in time to which the snapshot corresponds. Following is a more detailed discussion. In an embodiment, this process may be transparent to the consumer, such that the consumer simply receives a consistent snapshot.

As noted, an entity such as a filter for example may receive IOs and then mark, on a bitmap, the extents that correspond to disk areas affected by the IOs. As used herein, a 'dirty' bit is one which has been written to since a prior snapshot was taken, and a 'clean' bit is one which has not been written to since the prior snapshot was taken. Thus, a bitmap may have a combination of dirty bits and clean bits, denoted respectively in the bitmap by the example convention of '1' (dirty bit) and '0' (clean bit). In this way, IOs may be tracked in a light weight manner, with respect to computation, since the tracking simply involves setting bit values in the bitmap. In the example of FIG. 1, any dirty bits in the old map 106 and the new map 108 are dark, and any clean bits are white. It is noted that the aforementioned convention is provided by way of illustration and, in another embodiment, a different convention may be used, such as the reverse of the aforementioned convention. For example, and as disclosed elsewhere herein, a convention of '1' (clean bit) and '0' dirty bit may be used when creating a consolidated bitmap using a logical 'AND' rather than 'OR' operation.

Suppose, for the sake of illustration, that various changes resulting from IOs over a 24 hour period have been accumulated, and there is now a desire to backup, such as by taking a snapshot of, those changes that occurred in the 24 hour period. In order to create the snapshot, the data on disk that corresponds to the dirty bits may then be retrieved from a storage volume and sent to the customer or other entity who requested the snapshot. However, this retrieval and sending of data takes time, during which IOs may be received that are directed to the area that is to be included in the snapshot. The IOs cannot be written, at least not immediately, to that area since to do so would result in an inconsistent snapshot being sent to the customer, that is, the snapshot would include data from the new IOs that was not present in the storage volume as of the point in time (PIT) to which the snapshot corresponds. This circumstance may be addressed by an LWD approach.

In particular, when a snapshot is requested, a 'new' bitmap may be created that may be marked by the filter to reflect IOs that come in after the snapshot PIT. The new bitmap may initially be cleared, that is, all bits set to zero. At this stage then, the 'old' bitmap may indicate all IOs that have occurred in the 24 hour time period of interest, and the 'new' bitmap may indicate all changes taking place after that 24 hour period and during the period when the snapshot is being created. As noted above, the data corresponding to the dirty bits of the old bitmap may be sent to the consumer, but IOs may come in that are directed to snapshot data that has not yet been sent to the consumer.

In this case, the filter may copy that data to a temporary log, such as a file for example, thereby preserving that data for use as 'undo' data. As shown in FIG. 1, the example temporary log 112 includes data (dark portions) to be included in the snapshot, and to which IOs were directed before that data could be sent to the consumer as part of the snapshot. After the data has been copied from the volume into the temporary log, the filter 102 may then overwrite that data in the volume 110 according to the new IOs. That is, if overwritten data is sent to the consumer as part of the snapshot, the set of undo data in the temporary log may be applied to the snapshot, so as to overwrite IOs that came in during creation and transmission of the snapshot, and thus bring the snapshot to a consistent state with respect to the PIT of the snapshot. The temporary log can then be deleted after the undo operation has been performed on the snapshot.

B. ASPECTS OF SOME EXAMPLE EMBODIMENTS OF THE INVENTION

B.1 General Considerations

While the approach described above may be adequate for the circumstance where a single backup is being performed concurrently with the receipt of a stream of IOs, that approach may not be adequate for situations where multiple backups of an asset are needed to be performed concurrently with each other and with receipt of a stream of IOs. Thus, an embodiment of the invention may be directed to an LWD filter that may be able to accommodate multiple concurrent backups of the same asset. Multiple concurrent backups may be useful in situations where, for example, backups are needed to be written to multiple different types of media. For example, a customer may wish to concurrently write a backup of an asset to both disk and to tape. As another example, a customer may wish to concurrently write a backup of an asset to multiple different locations, such as an on-premises location, and a cloud location.

Note that as used herein, an 'asset' refers to any entity, which may comprise hardware and/or software, that comprises data that is to be protected. The data may or may not have been created or modified by the entity itself. Further, as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention may be applicable to any system capable of storing and handling various types of objects, in analog, digital, or other form. Although terms such as document, file, segment, block, or object may be used byway of example, the principles of the disclosure are not limited to any particular form of representing and storing data or other information. Rather, such principles are equally applicable to any object capable of representing information. Finally, as used herein, the term 'backup' is intended to be broad in scope. As such, example backups in connection with which embodiments of the invention may be employed include, but are not limited to, full backups, partial backups, clones, snapshots, and incremental or differential backups. Still other data protection processes in connection with which one or more embodiments may be employed include, but are not limited to, replication, continuous data protection, continuous snapshot transmission, direct to cloud/object storage, and other data protection types and operations.

B.2 Detailed Aspects of One or More Example Embodiments

In general, an embodiment of the invention may comprise and implement two parts, namely, metadata tracking and data transfer. These are discussed below.

B.2.1 Initial Considerations

For the purposes of illustration, assume a protected asset 'A' that has 'K' multiple cadences of parallel backups. For the purposes of simplicity, the discussion herein will assume K=2, although K can be any value 'n,' where 'n' is an integer equal to or greater than 1. Note that as used herein, an example 'cadence' may be expressed as one backup per hour (1 BU/hr), that is, the cadence or 'beat' is such that 1 hour passes between consecutive backups. In general, performing backups according to a particular cadence may result in the creation of a backup stream which represents the multiple points of time over which the backups of that asset are taken. Given this, an embodiment may be referred to as providing support for, that is, enabling, multiple parallel backup streams of a single common asset.

B.2.2 Bitmap Manipulation

In an embodiment, when tracking of a backup cadence begins, the embodiment may create a new bitmap, specific to that particular backup, that tracks the changes from that point in time onwards. Whenever a snapshot is requested for any of the backup cadences, an embodiment may create a new bitmap specific to a particular backup or snapshot, which may be referred to herein as a 'bitmap fragment,' that may track the changes in the volume data from the PIT of the snapshot forward to some defined point in time, such as the time when all the snapshot data has been sent to the consumer. Thus, an embodiment may always have a single active bitmap, and a sequence of older bitmap fragments, each corresponding to a respective period of time during which changes to a volume were tracked and recorded in the bitmap fragment. The bitmap fragments may be stored in any suitable device and location, such as in RAM, or in persistent memory such as disk, SSD, or flash memory, for example.

To illustrate with an example, if stream 1 backs up at an 8 hour period, and stream 2 does backups every 2 hours, there will be 4 bitmap fragments for stream 1, each bitmap fragment representing, or corresponding to, the full volume for a time period of two hours of tracking. Consolidating these 4 bitmaps (1 for stream 1, and 3 for stream 2) together will thus provide the tracking for the full volume over that 8 hour period.

Figure 2:
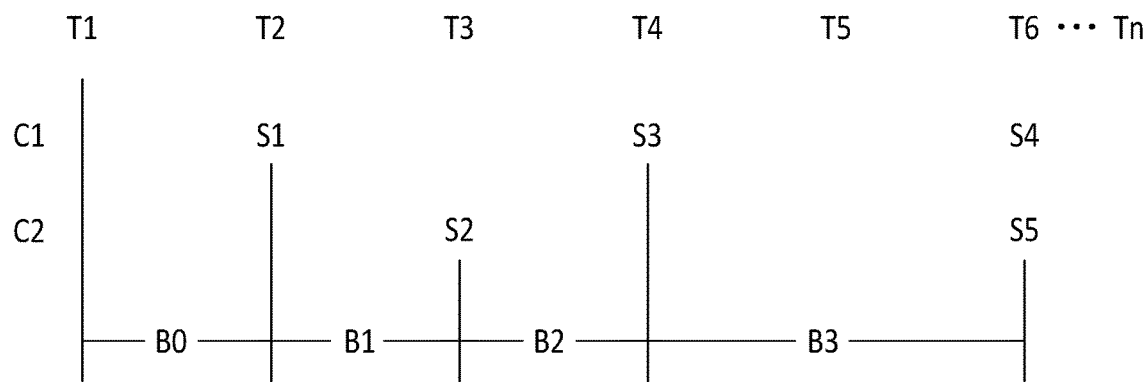
FIG. 2 discloses an example implementation in which changes to multiple concurrent backup streams are tracked.

Turning next to FIG. 2, a simplified illustration of the foregoing concept is disclosed. In the example of FIG. 2, there are two backup cadences, namely, C1 and C2. This example is limited to two cadences for the sake of illustration but in general, an embodiment may be implemented in connection with any number of cadences. The cadence C1 requires that a backup be taken every two hours, that is, at times T2, T4, and T6 in the example. On the other hand, cadence C2 requires a backup to be taken only every three hours, that is, at times T3 and T6 in the example. The timing of the requests for the respective backups for the cadences C1 and C2 determines when a bitmap fragment will be created.

Thus, a bitmap fragment B0 may be created at time T1, and reflects IOs received between time T1 and time T2. As well, a bitmap fragment B1 is created after snapshot S1 is requested, and reflects IOs received between the time T2 when S1 is requested and time T3 when S2 is requested. Another bitmap fragment B2 is created after snapshot S2 is requested, and reflects IOs received between the time T3 when S2 is requested and time T4 when S3 is requested. Finally, a bitmap fragment B3 is created after snapshot S3 is requested, and reflects IOs received between the time T4 when S3 is requested and time T6 when S4 and S5 are requested.

Note that each of the bitmap fragments B0, B1, B2, and B3, reflects all IOs that have occurred on disk during the respective associated time period, and not just the IOs that pertain to a particular one or the other of the cadences C1 and C2. Put another way, any given bitmap fragment indicates, for the relevant time period to which that bitmap pertains, all the IOs pertaining to all the cadences. Thus, and illustrated by the example of FIG. 2, at any given time, a single bitmap fragment is used to track all IOs for all streams.

With continued reference to the example of FIG. 2, and as discussed in more detail below in connection with FIG. 2a, a request for a backup may imply the use of multiple bitmap fragments. For example, snapshot S3 of cadence C1 would include all changes, due to IOs, that have occurred between time T2 when snapshot S1 was taken and time T4 when snapshot S3 was requested. However, there is no single bitmap fragment that includes all of these changes. Rather, bitmap B1 includes the changes that took place between T2 and T3, and bitmap B2 includes the changes that took place between T3 and T4. Thus, the information in bitmap B1 and bitmap B2 must be combined in some way to capture all the changes that are relevant to S3. This may be done by way of what may be referred to herein as a 'Diff map calculation.'

In particular, and with reference now to FIG. 2a, an embodiment may perform a 'Diff map calculation.' In an embodiment, this calculation 200 may be performed as follows. Given, in one example, several bitmap fragments that each represent different respective points in time T1-Tn, an embodiment may calculate the accumulated differences over all the bitmaps, or 'diff,' over the whole time period collectively spanned by the bitmap fragments, that is, T1-Tn. In the example of FIG. 2a, this may be done by performing a logical 'OR' over all the bitmap fragments, that is, over 'Bitmap1' 202 and 'Bitmap2' 204. In particular, and assuming for the sake of simplicity a comparison of 2 bitmap fragments, if either, or both, of the bits in a particular bitmap position in 'Bitmap1' 202 and 'Bitmap2' 204 are dirty, then the corresponding bit in a diff map 206 that captures the aggregate changes of 'Bitmap1' 202 and 'Bitmap2' 204 will be marked as dirty. The following examples are illustrative, but not limiting of the scope of the invention in any way.

The first bit in both 'Bitmap1' 202 and 'Bitmap2' 204 is dirty, so the first bit in the diff map 206 is marked as dirty. As another example, the third bit in Bitmap1' 202 is marked as clean, but the third bit in 'Bitmap2' 204 is marked as dirty and, because a logical 'OR' is being applied, the third bit in the diff map 206 is also marked as dirty. As a final example, the fourth bit in 'Bitmap1' 202 is marked as dirty, but the fourth bit in 'Bitmap2' 204 is marked as clean and, because a logical 'OR' is being applied, the fourth bit in the diff map 206 is also marked as dirty. As shown in FIG. 2a, the diff map 206 may then be analyzed together with another bitmap, 'Bitmap3' 208 in this example to produce still another diff map 210 which, in an embodiment, may be a final consolidated bitmap. The process disclosed in FIG. 2a may be performed for any number of bitmap fragments until a consolidated bitmap has been created that captures all the changes that have occurred in the volume during a particular time period.

Figure 2A:
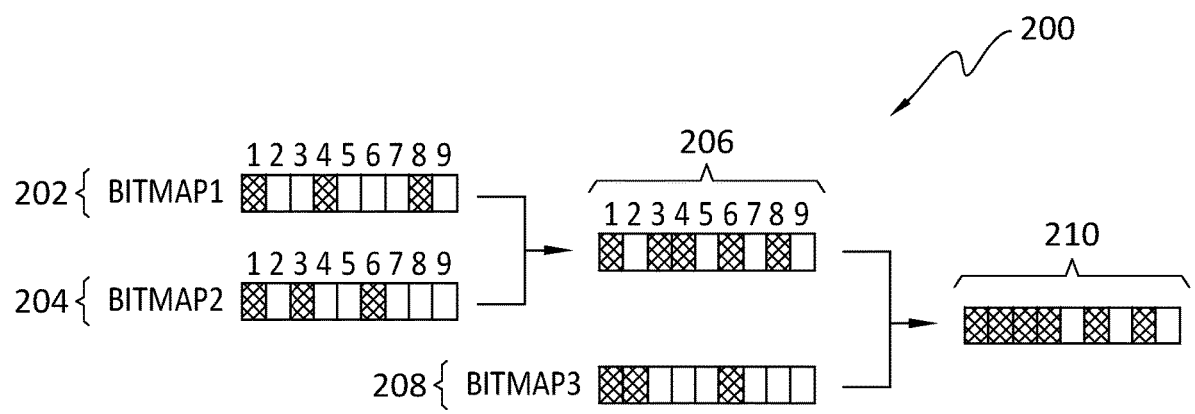
FIG. 2a discloses an example of the creation of a consolidated bitmap.

Thus, as disclosed in FIG. 2a, an embodiment may efficiently calculate an accumulated differential extending over a time period, such as T1-Tn in the example above, spanned by a cadence of 'n' backup streams. In the example of FIG. 2a, this may be done by loading one bitmap fragment at a time and performing a diff with the accumulated bitmap. When encountering a bitmap that is longer than the accumulated bitmap, an embodiment may perform a logical 'OR' between the end of the longer bitmap and 0. Though this operation may be commutative, for simplicity it may, in an embodiment, be performed in chronological order.

Use of a diff map calculation, such as in the manner described above, may imply various conditions or circumstances that may need to be addressed. These are, in no particular order: [1] handling incoming IOs while performing the diff map calculation, and while the snapshot data is being transmitted to the consumer; [2] identifying the relevant bitmaps for the specific backup; and [3] determining when an old bitmap can be removed. These are considered in turn below.

B.2.2.1 Handling Delay in Bitmap Accumulation

In an embodiment, the time that it takes to perform the 'Diff map calculation' may be a function of, for example, the number of bitmap fragments accumulated since the last backup was performed, and/or a function of where the bitmap fragments are stored. While the 'Diff map calculation' is being performed and snapshot data is being transmitted to the consumer, there may be IOs coming in with respect to data that is to be included in a snapshot. Thus, an embodiment may continue to mark the new IOs received on the active bitmap, that is, the bitmap that was created in response to the snapshot request. Once the calculation is complete, and there is a single bitmap representing the entire snapshot, the undo data for the new IOs may be written to the temporary log. It is noted that the bitmaps may be stored in memory, and calculation of the consolidation may be performed relatively quickly, such as in a matter of microseconds for example. Even if the bitmaps were to be stored in SSD, for example, it may be better, in an embodiment, to delay implementation of the IO while the calculation of the consolidation is being performed, as this may take less time than reading the data from the temporary log. However, while transmitting data to the consumer, which may take a matter of minutes or more, storing data, targeted by the IOs, in the temporary log may be a useful approach, in order minimize the delay in handling IOs coming in from the production IO source, and thus minimize the impact on the production IO source.

B.2.2.2 Identifying Relevant Bitmaps

As shown by the example operations below, to perform a backup, one embodiment may collect all the bitmaps between now, that is, the time when the backup was requested, and the last backup time. If there is no previous backup, an embodiment may perform a full sweep of the bitmap. Backups may be implemented according to a timetable or ad-hoc.

```
maxTime = currentTime
minTime = bs.lastBackupTime
if not minTime: //no minTime means first backup - full sweep
    Full sweep
else
    foreach bitmap in bitmaps:
        if bitmap.startTime ≥ minTime & bitmap.endTime ≤ maxTime:
            relevantBitmaps.add(bitmap)
```

B.2.2.3 Safely Removing Bitmaps

As shown by the example operations below, an embodiment may find the minimal time of a previous backup between all backup streams, and then remove any bitmap that is older than that time.

```
minTime = currentTime
foreach bs in backupStreams:
    minTime = min(minTime, bs.lastBackupTime)
foreach bitmap in bitmaps:
    if bitmap.endTime < minTime:
        remove bitmap
```

B.2.3 Temporary Log

Figure 3:
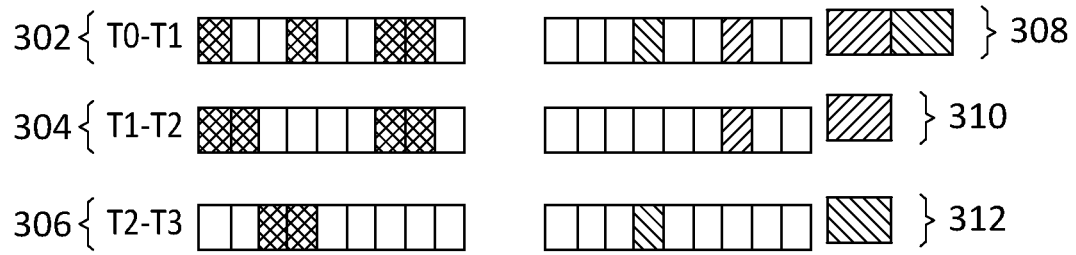
FIG. 3 discloses an example of the creation of temporary logs on a per bitmap fragment basis.
Figure 4:
FIG. 4 discloses an example of the creation of temporary logs on a stream basis.

With reference now to FIGS. 3 and 4, details are provided concerning various approaches for handling the temporary log that holds the data that was written from the disk or other storage device prior to that data being overwritten by an IO, according to one or more embodiments. Particularly, there may be a number of different approaches that may be used in one or more embodiments to handle the temporary log. By way of example, and not limitation, a temporary log may be handled on a per bitmap fragment basis. As another example, a temporary log may be handled on a per backup stream basis. These two examples are discussed below.

B.2.3.1 Per Bitmap Fragment Temporary Log

The result of holding one temporary log per bitmap fragment means that there is a separate temporary log for each bitmap that is relevant for the occurring backups. This circumstance is disclosed in FIG. 3. Particularly, FIG. 3 discloses three example bitmap fragments 302, 304, and 306, each of which corresponds to a timeframe, that is, T0-T1, T1-T2, and T2-T3, to be captured in a respective snapshot. Correspondingly, a respective temporary log 308, 310, and 312, may be created and held for each of the bitmap fragments 302, 304, and 306. If, or when, a new IO comes in while a snapshot is being taken, the undo data to which that IO pertains is read out of a storage volume and written to the applicable temporary log once for every fragment in which that area of the bitmap fragment which is dirty. When all the dirty bits in the consolidated bitmap have been checked, the temporary logs 308, 310, and 312, are sent out to the consumer or other user, beginning from the oldest bitmap fragment 302, and concluding in the newest bitmap fragment 306. This approach may also be employed when transmissions of the data for multiple backups of an asset are is occurring simultaneously.

B.2.3.2 Per Backup Stream Temporary Log

The result of holding a temporary log per stream means that there is a single temporary log that covers all the backups that are occurring simultaneously. This is shown in FIG. 4. Particularly, FIG. 4 discloses snapshots, collectively forming a backup stream, occurring simultaneously that collectively cover the time frame from T0 to T3. In this example, a single bitmap 402 is created and used that covers the entire timeframe collectively defined by all of the snapshots being taken. The bitmap 402 may comprise a consolidated bitmap as it covers all of the snapshots in the backup stream. In this example, a single temporary log 404 is provided for the backup stream. If, or when, a new IO comes in, the undo data to which that IO pertains is read and written once for the consolidated bitmap 402 in which that area is dirty. When all the dirty bits in the consolidated bitmap 402 have been checked, and after all of the backup data has been transmitted to the customer, the temporary log 404 may be sent out to the consumer or other user. Put another way, the sending of the temporary log may be a flow different from, and unrelated to, the handling of incoming new IOs that are directed to dirty areas of the disk while backup data is being transmitted to the customer. It is this latter process, that is, the handling of the new IOs, that causes, or at least contributes to, the creation and population of the temporary log.

Note that in an embodiment, there is one consolidated bitmap per backup stream that is currently transmitting, and there is a respective temporary log for each backup stream as well. Thus, when an IO comes in, it may be checked against each of these consolidated bitmaps, and then read from disk and written to each of the temporary logs. That is, the IO may be read multiple times and written multiple times. An optimization for this process, in which the IO is read only once, is disclosed elsewhere herein. Still another optimization is disclosed herein in which the IO is written only once.

B.3 Further Discussion

As will be apparent from this disclosure, an embodiment of the invention may comprise various useful aspects and features, one example of which is that multiple concurrent backups may be accommodated using a single tracking bitmap that tracks changes resulting from the backups. Further, this embodiment may maintain backup capabilities for the multiple concurrent use-case without additional production impact, that is, without material impact on production parameters such as latency, communications bandwidth, processing, and/or memory/storage consumption.

C. ADDITIONAL EXAMPLE FEATURES AND EMBODIMENTS

C.1 Optimization One Read, Multiple Writes

As noted elsewhere herein, when a write IO comes in during LWD transmission phase, that is, when a snapshot is being created and sent to a user, and the IO area is marked dirty in the bitmap, storage volume data corresponding to area may be read from the storage volume into a temporary log. However, when handling multiple bitmaps with multiple temporary logs, whether as per fragment or per stream temporary logs, the write IO may have to be handled for every temporary log maintained by the system. As a result, the latency incurred during the disk read and temporary log write increases and, in some instances, exceed an acceptable amount of latency.

This may present an opportunity to further optimize an embodiment. For example, as the bitmap fragments have the same resolution, a dirty bit in each bitmap covers the same area on the disk where the data is stored. Therefore, the disk area that is read for every dirty bit in a particular location is the same. This means that there is no need to read the disk for every bitmap. Rather, an embodiment may read a dirty area from the disk only once, and write the data from that disk area multiple times, that is, once for each temporary log, thus reducing the overall latency because only one read operation is performed.

C.2 Pointer Temporary Logs—One Write Optimization

In addition to the optimization addressed immediately above, an embodiment may be further optimized by managing the temporary logs through pointers, and not as a flat file. In more detail, a default temporary log implementation may be to have the IOs written in sequence in a file or in a temporary storage device. In this approach, IOs may be appended along with accompanying metadata that indicates the origin location, on disk, of the undo data in the temporary log.

In a multiple stream case such as disclosed herein, as stated before, it is possible that the same IO may need to be written to multiple temporary logs, which results in multiple write IOs to the temporary logs which take up space and increase latency. An alternative implementation is to provide a temporary log structured with metadata and data separated. The metadata holds the same metadata as before, that is, the location of the undo data on disk, but the metadata may also hold a pointer to the data location, such as in a separate file or a location in a data array, keeping in mind that all data read is the same size. With this configuration of a temporary log, data may only need to be written once, and the metadata in each temporary log may be updated to point to that same write location. That is, in this example implementation, the temporary log may not include the undo data itself, but instead simply include a pointer to the undo data which is stored and accessible elsewhere. This is shown in FIG. 5.

Figure 5:
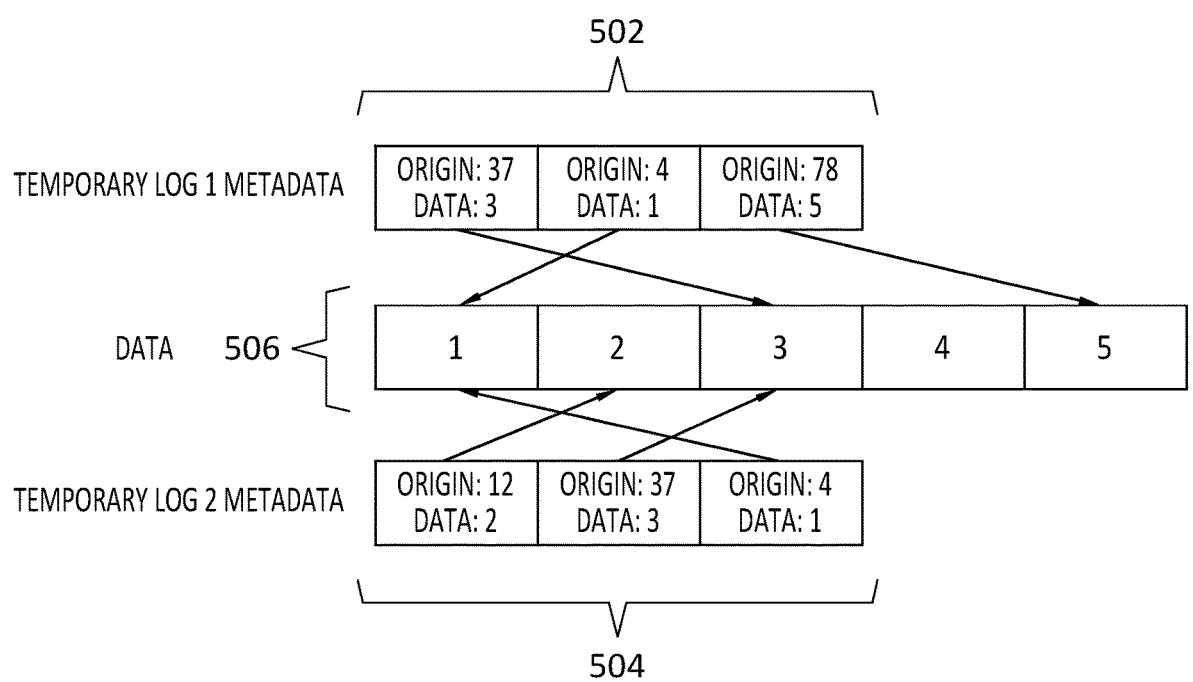
FIG. 5 discloses an alternative embodiment of a temporary log that includes pointers to data.

Particularly, FIG. 5 discloses example temporary log 1 metadata 502 and temporary log 2 metadata 504. One or more data segments 506 may be referenced by the temporary log 1 metadata 502 and/or the temporary log 2 metadata 504. Note that the origin location is connected to the data 506, so the data 506 may contain the data location and the actual data, and the temporary log metadata comprises just the pointers, and no data 506. By way of illustration, data block 1 has an origin location of 4 on disk.

Thus, for example, the temporary log 1 metadata 502 and temporary log 2 metadata 504 each comprise metadata that includes [1] the identification of the data block, namely, data block 1, and [2] the location of that data block 1, namely, origin 4, which may also be referred to as a 'pointer' as it indicates the location of the data block 1 on disk. In this particular illustration, data block 1 is referenced by both the temporary log 1 metadata 502 and temporary log 2 metadata 504, but that is not necessarily, nor always, the case. Thus, as another example, it can be seen that the temporary log 1 metadata 502 points to data block 5, but temporary log 2 metadata 504 does not. As a final example, the temporary log 2 metadata 504 points to data block 2, but temporary log 1 metadata 502 does not.

As illustrated by FIG. 5 and this discussion then, a possible implementation in one or more embodiments is that the data, that is, the undo data, is written in separate files named by the origin location, and the metadata held in the temporary log(s) is thus just a list of origin numbers and data blocks. Thus, an embodiment may provide a way of structuring a temporary log that may provide a relative reduction in latency, and disk space consumption, where multiple backups are being performed concurrently.

It is noted that when a data segment is no longer referenced, it can be deleted. This may be done, for example, by any one or more of: [1] keeping a reference count, that is, a count of times that the data segment has been referenced or accessed by a process; [2] performing a garbage collection scan to find what data segments are still in use; or [3] use the time(s) when there is no active transmission to delete all temporary log data.

C.3 Varying Sizes Bitmap

Still another feature of one or more embodiments concerns the implementation of bitmaps, or bitmap fragments, of various sizes. Particularly, the tracking bitmaps of a stream will all be the same size and bit granularity as they represent a volume of a specific size. As there are memory limits to the size of the bitmap however, when a volume is resized, such as by enlargement of the volume for example, there may be a need to reduce bitmap granularity in order to be able to fit the bitmap in memory for the new volume size.

In one CBT implementation, discussed elsewhere herein, the bitmap allocation size may be fixed. Therefore, as volumes grow larger, the granularity, which may be expressed as a ratio of volume size to bitmap size for example, may double in size each time. That is, each bit of the bitmap corresponds to an increased portion of the volume. As a result, if a disk of a volume resizes, there may be differences in bitmap fragment sizes and resolutions. Thus, an embodiment may implement a modification to a bitmap manipulation algorithm such as was described earlier herein.

Assume, for example, that a bitmap is extended, that is, increased in size, but the granularity, as defined in the context of the associated storage volume, did not change. The question may then become how to handle the new bitmap extension, that is, in order to achieve a desired granularity. Some possible approaches are discussed below.

1. New Disk Area Initialized
    If a new disk area, of a volume for example, is known to be initialized, typically with '0' values, the bitmap for the volume may be correspondingly be extended to accommodate for the new disk size with initial values of '0' for the bits in the extended portion, that is, the bits in the extended portion of the bitmap are initially marked as not dirty. When a bitmap of a shorter length is to be merged with the larger bitmap, the shorter bitmap may be extended with '0' bits as well. An 'OR' operation, as disclosed herein, may then be performed with respect to the bitmaps in order to ensure that the resulting extended bitmap is up to date.
2. New Disk Area not Initialized
    If the new disk area has not been initialized, the bitmap for the disk volume may be extended to accommodate for the new disk size with '1' in the bitmap, that is, the new area of the bitmap may be marked as dirty. However, when a bitmap of a shorter length is to be merged with the larger bitmap, the shorter bitmap may be extended with '0' bits, since this area of the shorter bitmap is dirty only from the time the disk is extended. An 'OR' operation, as disclosed herein, may then be performed with respect to the bitmaps in order to ensure that the resulting extended bitmap is up to date.

Now, consideration is given to a situation in which the bitmap granularity has changed. Note that either, or both, of the approaches discussed above for handling a new portion of an extended bitmap may be applied here. Typically, the granularity of a tracking bitmap may be expressed in powers of 2, which means that every reduction in granularity is by a factor of 2.

With this background, an embodiment may define a down-sampling operation as follows: given an existing bitmap of granularity X, and a new, reduced granularity, bitmap of granularity Y, a granularity 'reduction factor' may be defined as Y/X. Note this is the granularity ratio, and not the bitmap size ratio. The reduction factor may be used to down-sample bitmaps so that they can be successfully 'OR'd together with other bitmaps of different granularities. Thus, in this example, the bitmap of 32K granularity may be down-sampled so that it can be 'OR'd together with a bitmap of 8 KB granularity. The following example is illustrative. Note that an example of an 'OR' applied to bitmaps of the same granularity is disclosed in FIG. 2a.

Suppose that a bitmap granularity is initially 8 KB, and a granularity of a new, that is, extended, bitmap is 32 KB, the old bitmap having been extended to define a larger bitmap, that is, the new bitmap, sized to accommodate an increase in volume disk size for example. These numbers thus lead to a reduction factor of 32/8=4. To down-sample the original bitmap to the new granularity, an embodiment may "OR" together reduction factor bits to calculate the new bit value. Continuing this example, every 4 bits may be combined together onto the lower granularity bitmap. That is, in effect, each 4 bits of the new extended bitmap (32K granularity) correspond to 1 bit of the old bitmap (4K granularity). If any one of the 4 bits is dirty, the whole area of 4 bits may be considered to be dirty.

In an embodiment, a down-sampling process may extend to any newly extended area of a bitmap, initialized or not, with the original bit values designated according to one of the bitmap extension approaches referred to earlier herein. As should be apparent then, a down-sampling approach according to an embodiment may enable bitmaps of different sizes to be 'OR'd together as part of a process for creating a consolidated bitmap. Beneficially, this approach may enable the handling of changes in disk size, and attendant granularity/size changes in the volume bitmap without losing tracking data.

D. EXAMPLE METHODS

Figure 6:
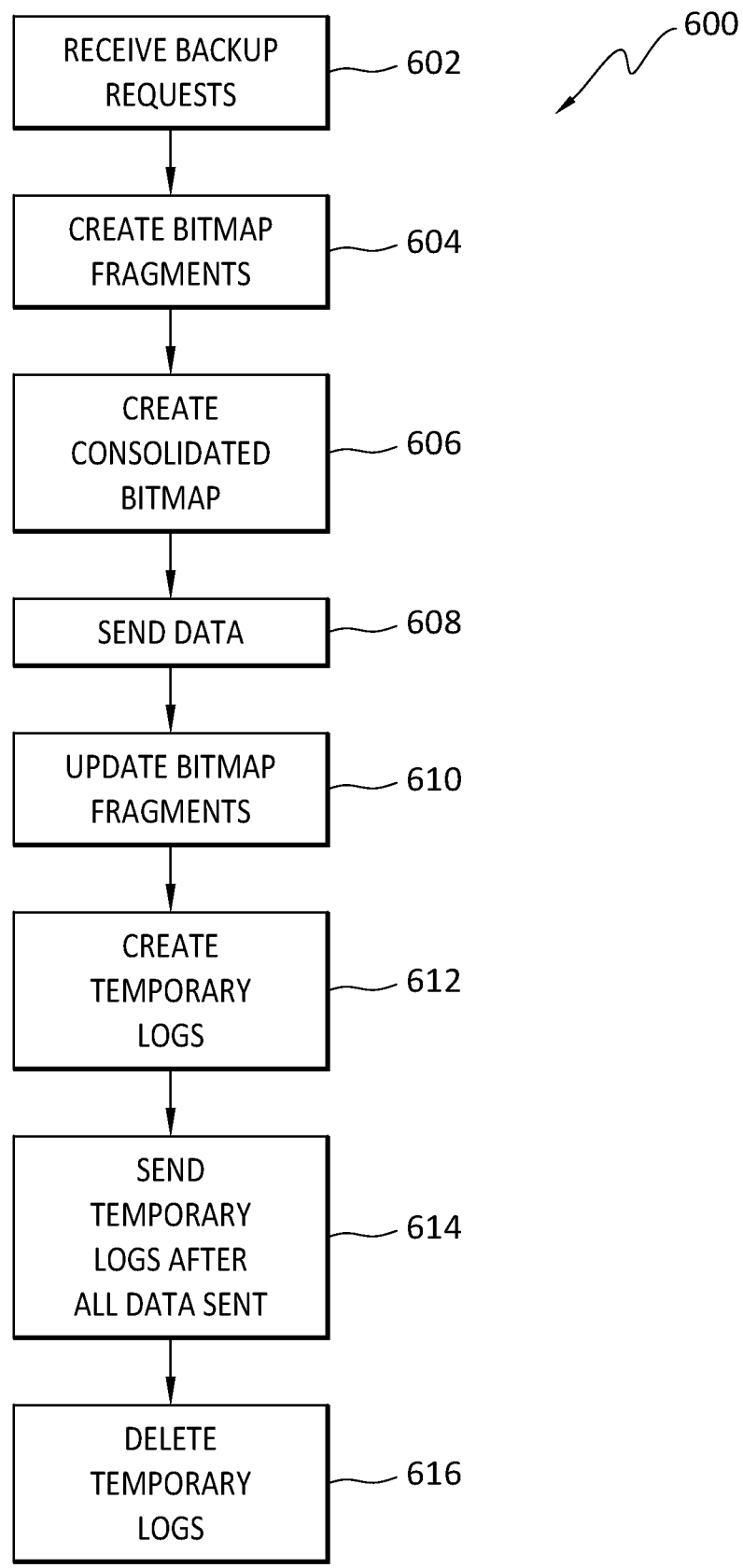
FIG. 6 discloses an example method according to one embodiment.

It is noted with respect to the disclosed methods, including the example method of FIG. 6, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, an example method according to one embodiment is generally denoted at 600.

Part or all of the method 600 may be performed by, and/or at the direction of, a filter, examples of which are disclosed herein. However, no particular functional allocation, or entity, is required for any embodiment of the invention, and the foregoing is provided only by way of example.

The example method 600 may begin with the receipt 602 of backup requests, such as requests to create snapshots as of a particular PIT. The backup requests may be received on an individual basis, or as part of a stream of backup requests. In an embodiment, a respective bitmap fragment may be created 604 for each requested snapshot. The bitmap fragment may correspond to a particular timeframe during which changes to a volume are tracked by that bitmap fragment. Particularly, the bitmap fragment is created 604 to continue tracking incoming IOs that are not included in, or implied by, the backup request, that is, IOs that come in after the receipt 602 of the backup request. Thus, the information in the bitmap fragment may be used in connection with a future backup request.

After the bitmap fragments have been created 604, a consolidated bitmap may be created 606, such as by an 'AND' process or an 'OR' process, that comprises the information in the bitmap fragments that were created prior to the time of receipt 602 of the snapshot request. Because the consolidated bitmap indicates the areas of the disk that were dirty, and clean, at the time of the backup request, the consolidated bitmap may be used as a basis to determine which data of the disk should be sent 608 to the requestor. That is, the data corresponding to the dirty areas of the disk, that is, the areas that have changed since the last backup request, are sent 608 to the customer.

Further, after receipt of the backup request 602 and creation of the bitmap fragments 604, and while data is being sent 608 to the customer, new IOs may be received that are directed to data embraced by the snapshot request. For example, a new IO may be directed to a bit of the disk that is indicated as dirty by the consolidated bitmap. The new IOs may result in various operations being performed.

First, one or more of the bitmap fragments may be updated 610 to reflect the changes, on disk, implied by these new IOs and, as noted, these bitmap fragments may be used later in connection with future backups. Second, temporary logs may be created 612 to hold a copy of the snapshot data, or 'undo' data, as that data existed prior to being modified by the new IOs. That is, dirty areas of the disk to which the new IOs are directed may be identified using the consolidated bitmap, and the data from the corresponding areas of the disk may be copied to the temporary logs before that data is overwritten by the new IOs.

After all of the backup data has been sent 608 to the consumer, then the temporary logs may be sent 614 to the consumer. After the temporary logs have been sent 614, they may be deleted 616. The combination of the data from the temporary logs, and the data transmitted 608 to the consumer in connection with the backup request, collectively defines a snapshot that is consistent as of the PIT to which that snapshot corresponds.

E. FURTHER EXAMPLE EMBODIMENTS

Following are some further example embodiments of the invention. These are presented only by way of example and are not intended to limit the scope of the invention in any way.

Embodiment 1. A method, comprising: receiving backup requests; creating a respective bitmap fragment for each backup request, and each bitmap fragment corresponds to a respective tracking start time; for a particular one of the requested backups, identifying a group of those bitmap fragments that correspond to a timeframe extending from a time at which a previous backup was requested to a time at which the particular backup was requested; using the bitmap fragments of the group to create a consolidated bitmap that comprises all changes to data in a volume resulting from IOs that took place during the timeframe; using the consolidated bitmap to read the data from the volume and transmit the data to a recipient; identifying new write IOs, received in parallel with transmission of the data, that are directed to data included in the particular backup; reading, from the volume, the data to which the new write IOs are directed, and storing that data in a temporary log; and transmitting the data from the temporary log to the recipient, and the transmitted data comprises the particular backup.

Embodiment 2. The method as recited in any of the preceding embodiments, wherein the backup requests are received either as parts of a single backup stream, or are received individually.

Embodiment 3. The method as recited in any of the preceding embodiments, wherein the backups are performed concurrently with each other.

Embodiment 4. The method as recited in any of the preceding embodiments, wherein creating the consolidated bitmap comprises applying a logical 'OR' operation across the bitmap fragments.

Embodiment 5. The method as recited in any of the preceding embodiments, wherein the data to which the new IOs are directed is overwritten according to the new IOs after that data has been stored in the temporary log.

Embodiment 6. The method as recited in any of the preceding embodiments, wherein applying the data of the temporary log to the data that was transmitted to the recipient ensures consistency of the particular backup.

Embodiment 7. The method as recited in any of the preceding embodiments, wherein the backup requests all pertain to a common asset.

Embodiment 8. The method as recited in any of the preceding embodiments, wherein each of the bitmap fragments comprises a record of all changes that have occurred to the volume during a respective timeframe to which the bitmap corresponds.

Embodiment 9. The method as recited in any of the preceding embodiments, wherein the temporary log is one of a group of temporary logs, and each of the temporary logs is maintained for a respective backup stream that is included in the backup requests.

Embodiment 10. The method as recited in embodiment 9, wherein the consolidated bitmap is one of a group of consolidated bitmaps, and each of the consolidated bitmaps corresponds to a respective backup stream, and the new write IOs are checked on each of the consolidated bitmaps and the data to which the new write IOs are directed is stored in the respective temporary logs.

Embodiment 11. The method as recited in any of the preceding embodiments, wherein the temporary log is one of a group of temporary logs, and each of the temporary logs is maintained for a respective bitmap fragment.

Embodiment 12. The method as recited in any of the preceding embodiments, wherein the new write IOs are checked on each of the bitmap fragments and the data to which the new write IOs are directed is stored in the respective temporary logs.

Embodiment 13. The method as recited in any of the preceding embodiments, wherein the data of the respective temporary logs is merged before being transmitted to the recipient.

Embodiment 14. The method as recited in any of the preceding embodiments, wherein any unused bitmap fragments are identified, and deleted.

Embodiment 15. The method as recited in any of the preceding embodiments, wherein the bitmap fragments comprise fixed size bitmap fragments.

Embodiment 16. The method as recited in any of the preceding embodiments, wherein the bitmap fragments comprise fixed granularity bitmap fragments.

Embodiment 17. The method as recited in any of the preceding embodiments, wherein creating the consolidated bitmap comprises applying a logical 'AND' operation across the bitmap fragments.

Embodiment 18. The method as recited in any of the preceding embodiments, wherein the bitmap fragments are stored in memory, or persistent storage.

Embodiment 19. The method as recited in any of the preceding embodiments, wherein one of the bitmap fragments tracks IOs occurring after that bitmap fragment was created until a time when a subsequent bitmap fragment is created.

Embodiment 20. The method as recited in any of the preceding embodiments, wherein part or all of the method is performed by a filter that resides in an IO path extending to the volume.

Embodiment 21. A system, comprising hardware and/or software, operable to perform any of the operations, methods, or processes, or any portion of any of these, disclosed herein.

Embodiment 22. A non-transitory storage medium having stored therein instructions that are executable by one or more hardware processors to perform operations comprising the operations of any one or more of embodiments 1-20.

F. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
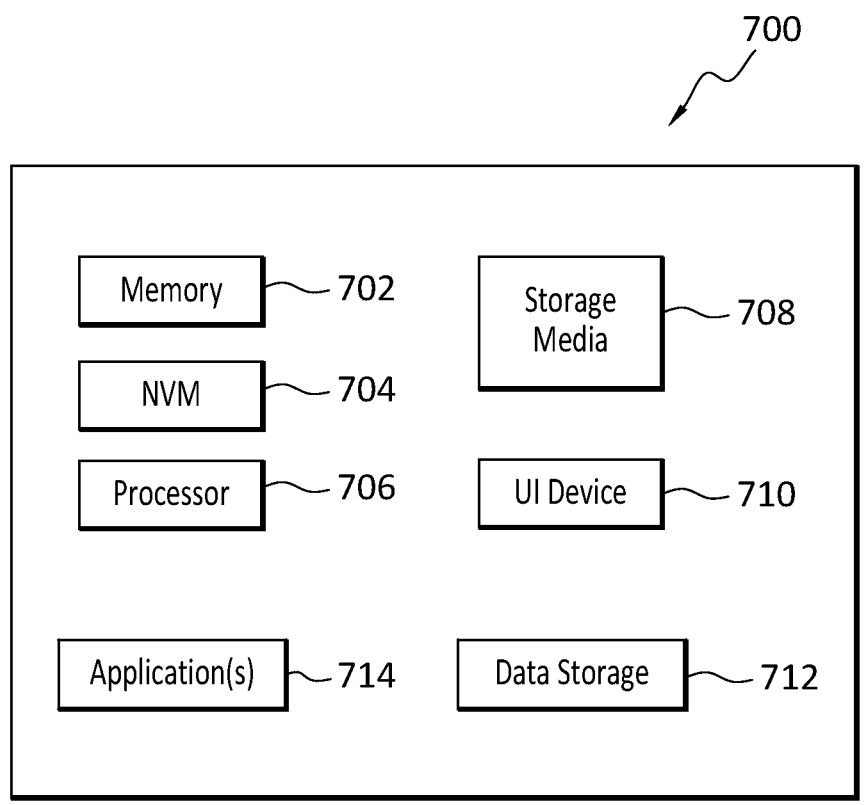
FIG. 7 discloses an example computing entity configured and operable to perform any of the disclosed methods, processes, and operations.

With reference briefly now to FIG. 7, any one or more of the entities disclosed, or implied, by FIGS. 1-6, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a light weight filter design that supports multiple concurrent backups, comprising:
   receiving backup requests;
   creating a respective bitmap fragment for each backup request, and each bitmap fragment corresponds to a respective tracking start time;
   for a particular one of the requested backups, identifying a group of those bitmap fragments that correspond to a timeframe extending from a time at which a previous backup was requested to a time at which the particular backup was requested;
   using the bitmap fragments of the group to create a consolidated bitmap that comprises all changes to first data in a volume resulting from IOs that took place during the timeframe;
   using the consolidated bitmap to read the first data from the volume and transmit the first data to a recipient;
   identifying new write IOs that came in after receipt of a particular backup request, are not included in the particular backup request but are directed to second data included in the particular backup;
   reading, from the volume, the second data to which the new write IOs are directed, and storing the second data in a temporary log; and
   transmitting the second data from the temporary log to the recipient.

2. The method as recited in claim 1, wherein the backup requests are received either as parts of a single backup stream, or are received individually.

3. The method as recited in claim 1, wherein respective backups corresponding to the backup requests are performed concurrently with each other.

4. The method as recited in claim 1, wherein creating the consolidated bitmap comprises applying a logical 'OR' operation across the bitmap fragments.

5. The method as recited in claim 1, wherein the second data to which the new IOs are directed is overwritten according to the new IOs after the second data has been stored in the temporary log.

6. The method as recited in claim 1, wherein applying the second data of the temporary log to the first data that was transmitted to the recipient ensures consistency of the particular backup.

7. The method as recited in claim 1, wherein the backup requests all pertain to a common asset.

8. The method as recited in claim 1, wherein each of the bitmap fragments comprises a record of all changes that have occurred to the volume during a respective timeframe to which the bitmap corresponds.

9. The method as recited in claim 1, wherein the temporary log is one of a group of temporary logs, and each of the temporary logs is maintained for a respective backup stream that is included in the backup requests.

10. The method as recited in claim 9, wherein the consolidated bitmap is one of a group of consolidated bitmaps, each of the consolidated bitmaps corresponds to a respective backup stream, and the new write IOs are checked on each of the consolidated bitmaps and the second data to which the new write IOs are directed is stored in the respective temporary logs.

11. The method as recited in claim 1, wherein the temporary log is one of a group of temporary logs, and each of the temporary logs is maintained for a respective bitmap fragment.

12. The method as recited in claim 11, wherein the new write IOs are checked on each of the bitmap fragments and the second data to which the new write IOs are directed is stored in the respective temporary logs.

13. The method as recited in claim 12, wherein the second data of the respective temporary logs is merged before being transmitted to the recipient.

14. The method as recited in claim 1, wherein any unused bitmap fragments are identified, and deleted.

15. The method as recited in claim 1, wherein the bitmap fragments comprise fixed size bitmap fragments.

16. The method as recited in claim 1, wherein the bitmap fragments comprise fixed granularity bitmap fragments.

17. The method as recited in claim 1, wherein creating the consolidated bitmap comprises applying a logical 'AND' operation across the bitmap fragments.

18. The method as recited in claim 1, wherein the bitmap fragments are stored in memory, or persistent storage.

19. The method as recited in claim 1, wherein one of the bitmap fragments tracks IOs occurring after that bitmap fragment was created until a time when a subsequent bitmap fragment is created.

20. The method as recited in claim 1, wherein part or all of the method is performed by a filter that resides in an IO path extending to the volume.

* * * * *

UNITED STATES PATENT AND TRADEMARK OFFICE
CERTIFICATE OF CORRECTION

| | | |
|---|---|---|
| PATENT NO. | : 12,417,147 B2 | Page 1 of 1 |
| APPLICATION NO. | : 18/302609 | |
| DATED | : September 16, 2025 | |
| INVENTOR(S) | : Nomi Michaels et al. | |

It is certified that error appears in the above-identified patent and that said Letters Patent is hereby corrected as shown below:

In the Specification

<u>Column 8</u>
Line 45, change "Bitmap2' 204" to – Bitmap2' 204 –

Signed and Sealed this
Twenty-third Day of December, 2025

John A. Squires
*Director of the United States Patent and Trademark Office*